(12) United States Patent  (10) Patent No.: US 8,111,973 B2
Ishino et al.  (45) Date of Patent: Feb. 7, 2012

(54) TELEVISION APPARATUS

(75) Inventors: Chiharu Ishino, Chigasaki (JP);
Katsunobu Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 664 days.

(21) Appl. No.: 12/331,211

(22) Filed: Dec. 9, 2008

(65) Prior Publication Data

US 2009/0148135 A1    Jun. 11, 2009

(30) Foreign Application Priority Data

Dec. 10, 2007  (JP) .................... 2007-318223

(51) Int. Cl.
*H04N 5/76*  (2006.01)
*H04N 5/89*  (2006.01)

(52) U.S. Cl. ...................... 386/291; 386/336

(58) Field of Classification Search .......... 386/291, 386/296, 336–340
See application file for complete search history.

(56) References Cited

U.S. PATENT DOCUMENTS

| 7,586,549 | B2* | 9/2009 | Heo .................. 348/738 |
| 2008/0104514 | A1* | 5/2008 | Kang et al. ............ 715/719 |

FOREIGN PATENT DOCUMENTS

| JP | 07-046500 | 2/1995 |
| JP | 2007-081496 A | 3/2007 |
| JP | 2007-0181496 | 3/2007 |

* cited by examiner

*Primary Examiner* — Thai Tran
*Assistant Examiner* — Nigar Chowdhury
(74) *Attorney, Agent, or Firm* — Kilpatrick Townsend & Stockton LLP

(57) ABSTRACT

The present invention provides a television apparatus that can reproduce and show a program when the program is stopped without a user performing troublesome operations even when the user is occupied with a sudden phone call or an unexpected visitor while he/she is watching television. A volume comparator starts recording of the program, which is currently being watched, by using a recording apparatus when a set volume value is lower than a threshold value or is set to a sound cancelling mode. Also, when a newly set volume value is higher than the threshold value or the sound cancelling is released, the volume comparator stops the display of the program that is currently being watched and starts reproducing display of the recorded program by returning to the recording start time point.

7 Claims, 4 Drawing Sheets

FIG.4

| NO | SHORTCUT REPRODUCING FUNCTION | CONTENTS |
|---|---|---|
| 1 | SLIDE DISPLAY | DURING INTERVAL INCLUDING CAPTION, DISPLAY SLIDE, WHICH IS FORMED INTO PAIR OF CAPTION DISPLAY AND STILL PICTURE, AT SHORT INTERVAL |
| 2 | MOTION AMOUNT INTERWORKING REPRODUCTION | REPRODUCE INTERVAL WHERE MOTION AMOUNT IS SMALL AT HIGH SPEED BY DETECTING MOTION OF MOVING PICTURE |
| 3 | SILENT INTERVAL SKIP | SKIP SILENT INTERVAL BY DETECTING VOICE |
| 4 | VARIABLE SPEED REPRODUCTION | PERFOFMED QUICKLY IN FIRST HALF OF REPRODUCTION AND ADJUSTED GRADUALLY TO EQUIMULTIPLE SPEED IN SECOND HALF |
| 5 | AUTOMATIC REPRODUCING MODE | AUTOMATICALLY SELECT SHORTCUT REPRODUCING FUNCTION BY DETERMINING CATEGORY OF PROGRAM |

TELEVISION APPARATUS

CLAIM OF PRIORITY

The present application claims priority from Japanese Patent Application No. JP 2007-318223, filed on Dec. 10, 2007, the content of which is hereby incorporated by reference into this application.

BACKGROUND OF THE INVENTION (1) Field of the Invention

The present invention relates to a television apparatus having a recording function.

(2) Description of the Related Art

In an environment where a telephone is installed near a television apparatus (hereinafter, referred to a TV), when a user has a sudden phone call while he/she is watching television, there are often cases where the user turns down the volume of a TV or switches it into a sound cancelling mode (mute) while he/she is on the phone so as to have the telephone conversation. Further, when the user has an unexpected visitor while he/she is watching television, the user may become unable to watch a portion of a broadcasting program due to entertaining the visitor. In such a case, even though the user stops watching the program and then, resumes watching the program, the user often misses the main idea of the program.

As one of the methods for coping with the above-mentioned problem, a method of displaying a caption has been proposed.

For example, JP-A-Hei7 (1995)-46500 discloses a television receiver including a caption signal outputting unit that outputs caption signals when making an audio signal mute, such that a user can understand the contents of a program even though the user has a phone call while he/she is watching the program. JP-A-Hei7 (1995)-46500 discloses that with the configuration, a viewer can view the caption instead of the audio signal so that he/she can follow the contents of the program.

Further, JP-A-2007-81496 discloses a television apparatus including a caption display controller that controls a display state of a caption display so as to watch the program without causing an incongruous feeling or an unpleasant feeling by automatically controlling caption information depending on a setting value of a volume. By the caption display controller, a volume setting unit compares the set volume value with a preset threshold value of a volume so that it displays the caption information when the set volume value is lower than the threshold value and does not display the caption information when the set volume value is higher than the threshold value. JP-A-2007-81496 discloses that with the configuration, the user can understand the contents of the program broadcasted from the television without needing to reset the new caption display operation and the like even in the environment where the volume of the television is low.

As another method, in the case of a television apparatus having a recording function or a television apparatus connected to a recording apparatus, there is a method using the recording function. In other words, when a user has a phone call or an unexpected visitor, he/she continuously records on a recording medium the program that the user has been watching, reproduces it later, and watches it at a period where the user stopped watching.

SUMMARY OF THE INVENTION

When there is a need to temporarily turn down a volume or switch it into a sound cancelling mode while a user is watching television, a screen display using the caption information is effective as an alternative method of continuously watching television. However, the caption display method is useful during the occurrence of human conversation and the like, but is impractical during a music program and the like.

Further, the method that records the program during a period where the program is stopped and reproduces it later is effective regardless of the contents of the program. However, the user needs to perform the operation of the volume of the television and the recording and reproduction. Since these operations need to be quickly performed without an error, these operations are problematic for the user and thus, the method is inconvenient for the user.

The present invention proposes to solve these problems. It is an object of the present invention to provide a television apparatus that can reproduce and view a program during a stopped period without a user performing a troublesome operation even when the user is occupied with a sudden phone call or an unexpected visitor while he/she is watching television.

There is provided a television apparatus having a function that records the program using a recording apparatus according to the present invention, including: a volume setting unit that sets a volume value while a user is watching the program; a voice controller that adjusts a voice output depending on the set volume value; an image synthesizer that synthesizes images to be displayed with captions; a volume comparator that compares the set volume value with a preset threshold value; and a recording controller that controls a recording and reproduction of a program to a recording apparatus. The volume comparator transmits an instruction signal of a recording start to the recording controller and starts the recording of the program, which is currently being watched, by using the recording apparatus, when the set volume value is lower than a threshold value or set to a sound cancelling mode.

Moreover, in a period in which the recording by the recording apparatus is performed according to the instruction of the volume comparator, when a newly set volume value is higher than the threshold value or the sound cancelling mode is released, the display of the program, which is currently being watched, stops, the instruction signal of the reproduction start is transmitted to the recording controller, and the reproducing display of the program that is recorded by returning to the recording starting time point starts.

Further, when the reproducing display of the recorded program is performed, the recording controller has a shortcut reproducing mode that reproduces the program by making the reproducing time shorter than a general time.

With the present invention, the user can reproduce and watch the program during the stopped period without the user performing the troublesome operations. In addition, since the user can watch the program within a short time without damaging the contents of the stopped program, the convenience of use is excellent.

BRIEF DESCRIPTION OF THE DRAWINGS

These and other features, objects and advantages of the present invention will become more apparent from the following description when taken in conjunction with the accompanying drawings wherein:

FIG. 4 is a diagram for explaining five kinds of functions that are effective for time shortening reproduction.

DETAILED DESCRIPTION OF THE EMBODIMENT

Hereinafter, exemplary embodiments of a television apparatus according to the present invention will be described with respect to the accompanying drawings.

First Embodiment

Figure 1:
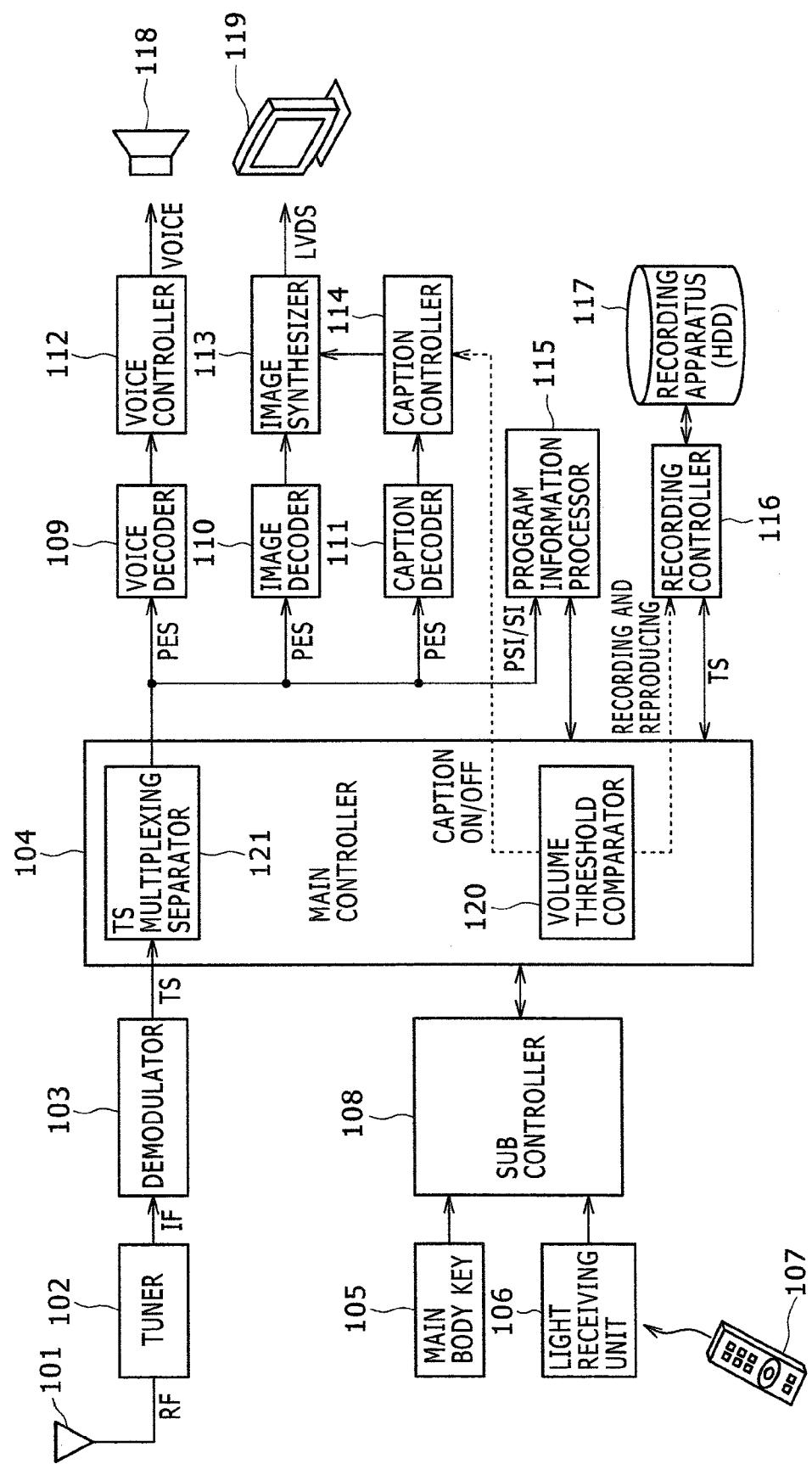
FIG. 1 is a block diagram showing a configuration of a first embodiment of a television apparatus according to the present invention.

FIG. 1 is a block diagram showing a configuration of a first embodiment of a television apparatus according to the present invention.

A digital broadcasting wave, which is received in an antenna 101, is input to a tuner 102 and after a desired channel is selected, is converted into an intermediate frequency signal (IF signal). A demodulator 103 demodulates the IF signal (digital modulation signal) and outputs a transport stream (TS). In the TS, data contents in addition to images or voices are multiplexed. A main controller 104 separates the received TS in a TS multiple separator 121 and transmits each packetized elementary stream (PES) of an image, a voice, and a caption/a character super-data to decoders 109, 110, and 111. Further, a PSI/SI (Program Specific Information/Service Information) including program contents or genre information is transmitted to a program information processor 115. Herein, the stream, which is encoded into a format such as an MPEG2 or H.264 etc., is decoded (decoding).

Voice data decoded in the voice decoder 109 is processed in a voice controller 112 and the sound quality or volumes thereof are adjusted by control from the main controller 104.

Image data decoded in the image decoder 110 is processed in an image synthesizer 113 and various image qualities thereof are adjusted by control from the main controller 104. The decoded image data is synthesized with caption signals from a caption controller 114 and then, converted into a low voltage differential signaling (LVDS).

Caption and character data decoded in the caption decoder 111 is processed in the caption controller 114 and transmitted to the image synthesizer 113 depending on an ON/OFF setting of a caption display from the main controller 104 and synthesized with image signals.

The voice signals and the image signals, which are processed in the voice controller 112 and the image synthesizer 113, are transmitted to a speaker 118 and a display device 119, which outputs and displays the voice and images.

The television apparatus according to the first embodiment further has a recording function. A recording apparatus 117 records a received television broadcasting program in a recording medium such as an HDD and the like and a recording controller 116 controls the operations of recording and reproduction of the recording apparatus 117. It can be optional for the recording apparatus 117 to be built in the television apparatus or connected to the outside. When the television apparatus is connected to the outside, the control can be performed by the recording controller 116 of the television apparatus. The program information processor 115 extracts EPG (Electronic Program Guide) information from the PSI/SI received from the TS multiple separator 121, which is used for performing a reservation setting or an automatic recording of the program recording. The recording of the program records the TS from the main controller 104. Further, the reproduced TS is decoded in each of the decoders 109, 110, and 111 and the images or voice is output from the display apparatus 119 or the speaker 118.

A main body key 105 receives the operations of the user and transmits the operation signals to a sub controller 108. Further, a light receiving unit 106 of a remote controller receives infrared rays from a remote controller 107 and transmits signals operated by the user to the sub controller 108. The sub controller 108 refers to an embedded memory to transmit the control signals to the main controller 104 according to a kind of input infrared signals or operation signals.

In the first embodiment, as the operation functions of the remote controller 107 and the main body key 105, there are functions that install a volume up/down key and a sound cancelling (mute) key as well as functions that automatically set the recording and reproduction and automatically set the caption display. In connection with this, the main controller 104 is provided with a volume threshold comparator 120, which compares a volume value set by the user with a preset threshold value. The main controller 104 transmits the control signals, which start and stop the recording and reproduction, to a recording controller 116 based on the comparison results of the volume. Further, the main controller 104 transmits the control signals of an ON/OFF switching of the caption display to the caption controller 114. By the above configuration, the main controller 104 has the functions that control the recording and reproduction by interworking with the volume value set by the user and perform the ON/OFF of the caption display.

Next, the control operation of the recording and reproduction and the caption display in the television apparatus according to the first embodiment will be described.

First, in order to perform the recording and reproducing operations in the recording apparatus 117, the user installs a manual mode that manually performs the recording, reproduction, and recording reservation as well as an "automatic recording mode" that automatically performs the recording and reproduction by interworking with the setting value of the volume. Further, in order to perform the operation of the caption display, the user installs a manual mode that manually switches the ON/OFF of the display as well as an "automatic caption mode" that automatically switches the ON/OFF of the caption display by interworking with the setting value of the volume.

In the "automatic recording mode", the volume threshold comparator 120 compares the volume value A set by the user with the preset threshold value Ath. At this time, if a volume value A is lower than a threshold value Ath or is switched into the sound cancellation (mute) (A=0), the instruction signal of the recording start is transmitted to the recording controller 116 to automatically start the recording of the program that is currently being watched. Also, during the recording of the program, if the volume value A is set to be higher than a threshold value Ath or the mute is released, the display of the program, which is currently being watched, stops, the instruction signal of the reproducing start is transmitted to the recording controller 116, and the reproducing display of the program that is recorded by automatically returning to the recording starting time point starts. At this time, a so-called "follow-up reproduction" is realized by continuously recording the program, which is being received, in the recording apparatus 117, such that the program can be watched without stopping.

Likewise, in the "automatic caption mode", if the volume value A is lower than the threshold value Ath or is switched into the mute (A=0), the ON instruction signal of the caption display is transmitted to the caption controller 114 to automatically display the captions of the program that is currently being watched. Further, if the volume value A is set to be higher than the threshold value Ath or the mute is released, the OFF instruction signal of the caption display is transmitted to automatically cancel the captions of the program that is currently being watched.

When the user has a sudden phone call or an unexpected visitor while he/she is watching television, if the user turns down the volume of the television that is currently being watched or switches it into the sound cancelling (mute) state so as to cope with this situation, the program, which is currently being watched, is automatically and continuously recorded in the recording medium of the recording apparatus 117 by installing the "automatic recording mode". When the telephone conversation ends or the visitor leaves the user, if the user turns up the volume of the television or releases the mute, the program during a stopped period is automatically reproduced such that the user can watch the program.

As a result, even when the user has a sudden phone call or an unexpected visitor while he/she is watching television, the user can reproduce and watch the program during a stopped period without the user performing the troublesome operations.

Also, even though the user turns down the volume of the television or switches it into the mute state, since the continued portion of the program, which is being watched, can be understood to some degree by the caption display by installing the "automatic caption mode", the method is convenient if the contents of the program or the user's current situation is considered.

Figure 2:
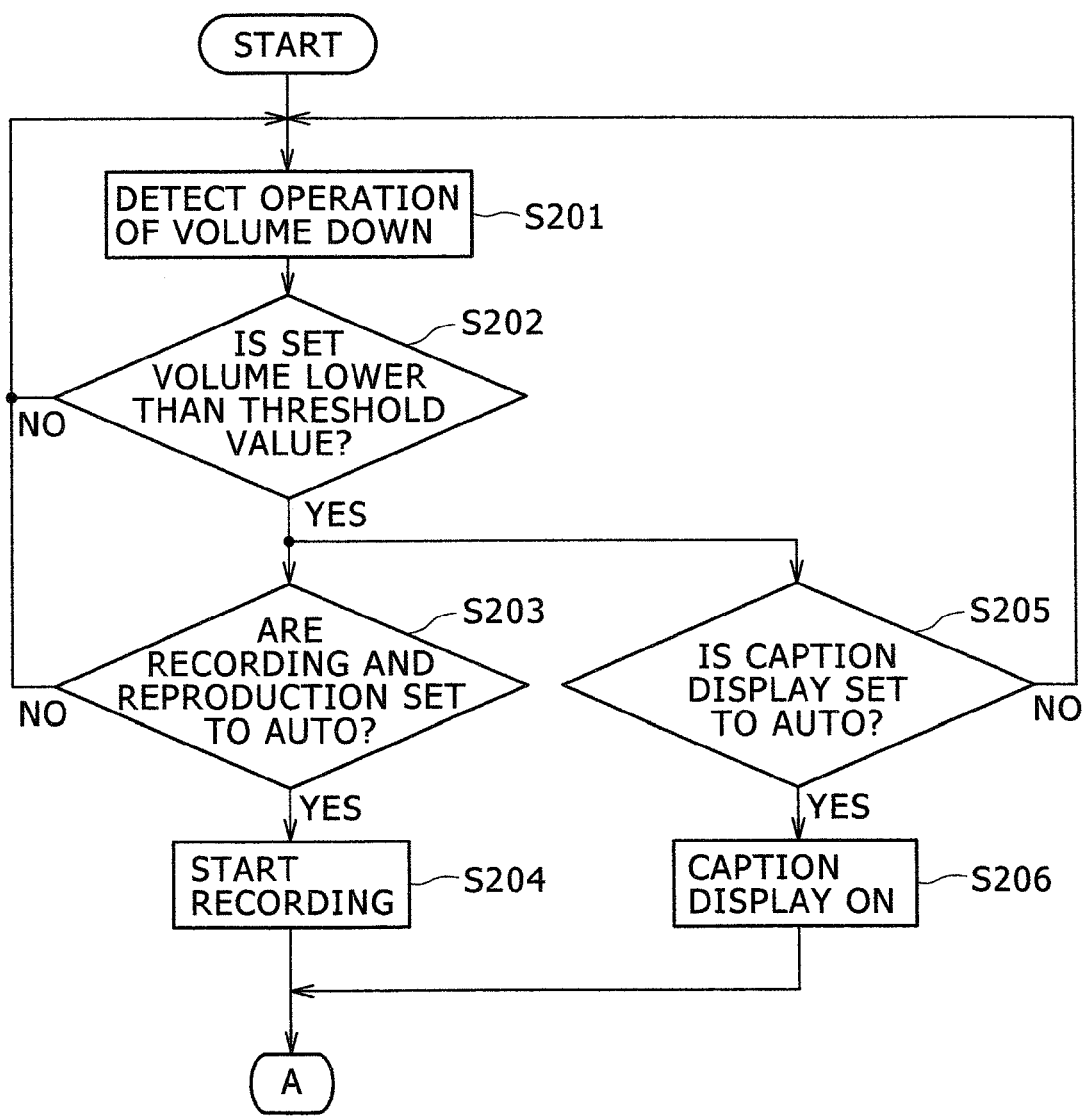
FIG. 2 is a flow chart (the first half) showing a control of an automatic recording mode and an automatic caption mode.
Figure 3:
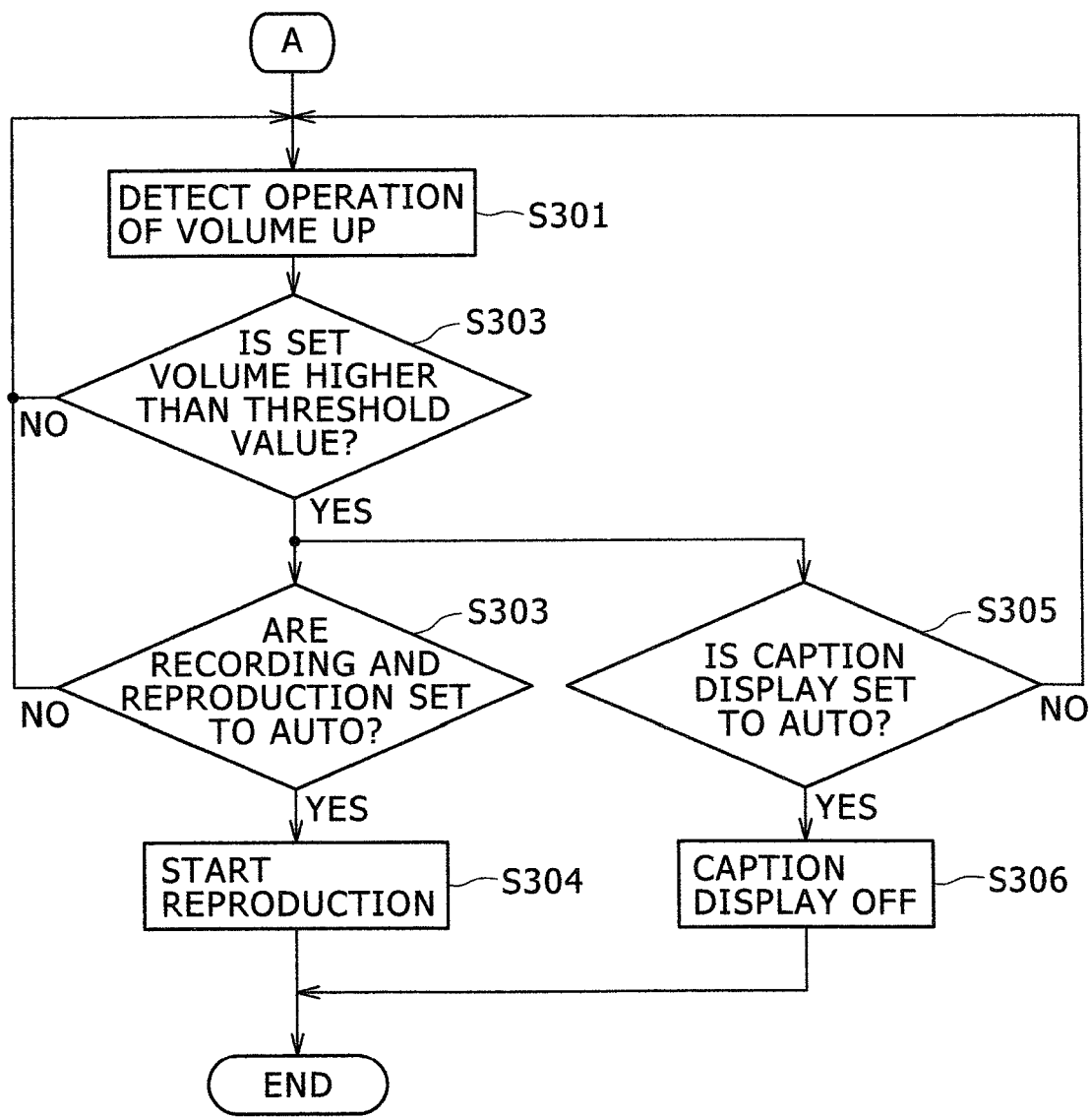
FIG. 3 is a flow chart (the second half) showing a control of an automatic recording mode and an automatic caption mode.

FIGS. 2 and 3 are flow charts showing the control of the automatic recording mode and the automatic caption mode according to the first embodiment and FIG. 2 shows the first part of the control and FIG. 3 shows the last part of the control.

In FIG. 2, assume that the user is watching a program.

At step 201, the operation of the volume down key of the remote controller 107 (or, the main body key 105) or the operation of the mute key by the user is detected. If any one of the operations is operated, at step 202, the volume threshold comparator 120 compares the set volume value A with the preset threshold value Ath. If the volume value A is lower than the threshold value Ath as a result of the comparison, it proceeds to step 203 and step 205. If the volume value A is higher than the threshold value Ath, it returns to step 201 and waits for the next volume operation.

At step 203, it is determined whether the recording and reproducing mode is set to the "automatic recording mode" (AUTO) by the remote controller 107, and the like. If it is set to AUTO, it proceeds to step 204 and the instruction signal of the recording start is transmitted to the recording controller 116 and the recording of the program, which is currently being watched, is started by the recording apparatus 117. If it is not set to AUTO (manual mode), it returns to step 201 and waits for the next volume operation.

Further, at step 205, it is determined whether the caption display mode is set to the "automatic caption mode" (AUTO) by the remote controller 107, and the like. If it is set to AUTO, it proceeds to step 206, the ON instruction signal of the caption display is transmitted to the caption controller 114, and the caption of the program, which is currently being watched, is displayed on a display apparatus 119. If it is not set to AUTO (manual mode), it returns to step 201 and waits for the net volume operation.

By the above process, if the "automatic recording mode" or "the "automatic caption mode" is selected and the volume value is set to be lower than the threshold value by user, the recording and the caption display of the program, which is currently being watched, automatically start.

Next, FIG. 3 shows performance of the recording and caption display of the program while the user is watching the program, according to the result of FIG. 2.

At step 301, the operation of the volume up key or the operation of the mute key of the remote controller 107 (or, the main body key 105) by the user is detected. If any one of the operations is operated, at step 302, the volume threshold comparator 120 compares the set volume value A with the preset threshold value Ath. As a result of the comparison, if the volume value A is higher than the threshold value Ath, it proceeds to step 303 and step 305. If the volume value A is lower than the threshold value Ath, it returns to step 301 and waits for the next volume operation.

At step 303, it is determined whether the recording and reproducing mode is set to the "automatic recording mode" (AUTO) by the remote controller 107 and the like. If it is set to AUTO, it proceeds to step 304, the display of the program, which is currently being watched, stops, the instruction signal of the reproducing start is transmitted to the recording controller 116, and the reproducing display by returning the recorded program by the recording apparatus 117 to the recording starting time point start. At this time, the recording apparatus 117 continuously records the program, which is currently being watched, to realize the "follow-up reproduction", such that the user can watch the program without stopping the program. If it is not set to AUTO (manual mode), it returns to step 301 and waits for the next volume operation.

Also, at step 305, it is determined whether the caption display mode is set to the "automatic caption mode" (AUTO) by the remote controller 107 and the like. If it is set to AUTO, it proceeds to step 306, the OFF instruction signal of the caption display is transmitted to the caption controller 114 and the caption display of the program displayed by the display apparatus 119 is cancelled. If it is not set to AUTO (manual mode), it proceeds to step 301 and waits for the next volume operation.

By the above process, if the "automatic recording mode" or "the "automatic caption mode" is selected and the volume value is set to be lower than the threshold value by the user, the reproduction of the program automatically starts during the stopped period and the caption display ends.

The threshold value Ath used in the volume threshold comparator 120 can be appropriately set by the user. Further, when the threshold value at the time of turning down the volume (step 202) and the threshold value at the time of turning up the volume (step 302) are different, if the latter value is higher, the operation, which controls the switching, is stable.

With the first embodiment, even when the user has a sudden phone call or an unexpected visitor while he/she is watching the program, the ON/OFF of the display of the recording and reproducing function or the caption information by interworking with the setting value of the volume is automatically controlled. By this, the user reproduces and watches the program of the missed portion without performing the troublesome operations such as the operations of the recording and reproduction or the caption display, and even when the volume is also low, the program contents can be understood to some degree by the caption.

Second Embodiment

After the automatic recording is performed in the first embodiment, when performing the "follow-up reproduction" on the stopped program, the stopped program is reproduced by shortening the reproducing time more than a general reproducing time, such that the program displayed by the display apparatus can be returned to real time broadcasting. Herein, a detailed method of the time shortening reproduction is described.

FIG. 4 is a diagram for explaining five kinds of functions that are effective for the time shortening reproduction.

(1) Slide display: When the caption data is included in the recorded program, a slide screen is prepared by forming a pair of a caption data and a still picture (I picture) corresponding to the same presentation time. The reproducing time is shortened by skipping the image during a period in which there is no caption data. In this case, the preparation of the slide screen can be performed by the caption controller 114 and the image synthesizer 113 of FIG. 1.

(2) Motion amount interworking reproduction: The motion amount of a moving picture is detected from the recorded program. It is reproduced at a high speed in an interval where the motion amount is small. Further, the voice in the same interval is compressed and reproduced. By this, the reproducing time in an interval where the motion amount is small is shortened. For the detection of the motion amount, it is possible to use the motion compensating information between frames that is performed in the image decoder 110, for example. Also, the time compression of the voice is performed in the voice controller 112.

(3) Silent interval skip: A presence/absence interval of the voice is determined from the recorded program. In the silent interval that does not include the voice information, the program is skipped (omission), reproduced, and displayed. By this, the reproducing time of the silent interval can be cancelled. The determination of the presence/absence of the voice is made by comparing the voice signal level with the threshold value in the voice controller 112. Further, when the silent time is continued for predetermined time or more, it may be determined to be the silent interval.

(4) Variable speed reproduction: The reproduction speed of the recorded program is quickly performed in the first half after the reproducing start and is gradually reduced to an equimultiple-speed in the second half. For example, when an initial speed at a three-multiple speed is slowly reduced, it can catch up with the real time broadcasting when the time about twice as much as the stopped time has elapsed. Variable speed reproduction is adjusted by the recording controller 116.

(5) Automatic reproducing mode: Although the above-mentioned functions may be selected individually or in combination, the "automatic reproducing mode", which automatically selects the program according to the program genre, can be installed. Herein, the program genre is detected based on the EPG information by the program information processor 115. For example, in the case of programs such as a news program, a weather forecast and the like whose contents can be sufficiently understood by the character information, the slide display function of (1), which mainly performs the caption display, is selected. Further, when it is difficult to reproduce or high-speed reproduce the program such as music program in the character information, the silent interval skip of (3) is selected. With the "automatic reproducing mode", the reproducing time is shortened without damaging the program contents by determining the program genre at the time of the reproduction and the display program can be returned to the real time broadcasting at the short time in the "follow-up reproduction".

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the admit of the appended claims.

What is claimed is:

1. A television apparatus having a function that watches a broadcasted program and records the program using a recording apparatus, comprising:
   a volume setting unit that sets a volume value while a user is watching the program;
   a voice controller that adjusts a voice output depending on the set volume value;
   an image synthesizer that synthesizes images to be displayed with captions;
   a volume comparator that compares the set volume value with a preset threshold value; and
   a recording controller that controls a recording and reproduction of a program to a recording apparatus,
   wherein the volume comparator transmits an instruction signal of a recording start to the recording controller and starts the recording of the program, which is currently being watched, by using the recording apparatus, when the set volume value is lower than a threshold value or set to a sound cancelling mode.

2. The television apparatus according to claim 1, wherein in a period in which the recording by the recording apparatus is performed according to the instruction of the volume comparator, when a newly set volume value is higher than the threshold value or the sound cancelling mode is released, the volume comparator stops the display of the program, which is currently being watched, transmits the instruction signal of the reproduction start to the recording controller, and starts the reproducing display of the program that is recorded by returning to the recording starting time point.

3. The television apparatus according to claim 2, further comprising a caption controller that controls the display of the caption included in the program,
   wherein when the set volume value is lower than the threshold value or is set to the sound cancelling mode, the volume comparator transmits an ON instruction signal of the caption display to the caption controller and displays the caption of the program that is currently being watched, and
   when the newly set volume value is higher than the threshold value or the sound cancelling mode is released, transmits an OFF instruction signal of the caption display to the caption controller and cancels the caption of the program that is currently being watched.

4. The television apparatus according to claim 2, wherein when performing the reproducing display of the program that is recorded using the recording apparatus by the instruction of the volume comparator, the recording controller has a shortcut reproducing mode that makes reproducing time shorter than general time and reproduces the program.

5. The television apparatus according to claim 4, wherein as the shortcut reproducing mode, when caption data is included in the recorded program, the image synthesizer prepares a slide screen by forming a pair of the caption data and still pictures corresponding to the same presentation time and skips and displays the image during a period where there is no caption data.

6. The television apparatus according to claim 4, wherein as the shortcut reproducing mode, the image synthesizer skips and reproduces the program during a silent period that is not included in voice information by determining the presence/absence interval of the voice from the program recorded by the voice controller.

7. The television apparatus according to claim 4, further comprising a program information processor that detects a genre of the reproduced program,
   wherein the shortcut reproducing mode of the program is selected according to the detected genre.

* * * * *